(12) United States Patent

Choi et al.

(10) Patent No.: US 12,189,765 B2
(45) Date of Patent: Jan. 7, 2025

(54) MEMORY SYSTEM

(71) Applicant: SK hynix Inc., Gyeonggi-do (KR)

(72) Inventors: Joon-Woo Choi, Busan (KR); Jeong-Tae Hwang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/516,549

(22) Filed: Nov. 21, 2023

(65) Prior Publication Data

US 2024/0086531 A1 Mar. 14, 2024

Related U.S. Application Data

(62) Division of application No. 16/842,483, filed on Apr. 7, 2020, now Pat. No. 11,861,000.

(30) Foreign Application Priority Data

Aug. 7, 2019 (KR) .......................... 10-2019-0096200

(51) Int. Cl.
*G06F 21/00* (2013.01)
*G06F 21/55* (2013.01)

(52) U.S. Cl.
CPC .................................. *G06F 21/554* (2013.01)

(58) Field of Classification Search
CPC ...... G06F 21/554; G06F 21/602; G06F 21/79; G06F 21/75
See application file for complete search history.

(56) References Cited

U.S. PATENT DOCUMENTS

| 9,659,621 | B2* | 5/2017 | Seo .......................... G11C 8/12 |
| 2007/0242538 | A1* | 10/2007 | Chen ................ G11C 29/50016 |
| | | | 365/201 |
| 2011/0131445 | A1* | 6/2011 | Pyeon ................. G06F 13/4243 |
| | | | 714/E11.007 |
| 2017/0358327 | A1* | 12/2017 | Oh .......................... G11C 5/02 |
| 2019/0265976 | A1* | 8/2019 | Goryavskiy ........ G06F 9/30058 |

OTHER PUBLICATIONS

Gassend et al., "Caches and Hash Trees for Efficient Memory Integrity Verification", Proceedings of the the Ninth International Symposium on High-Performance Computer Architecture (HPCA-9'03) (Year: 2003).*

* cited by examiner

*Primary Examiner* — Morshed Mehedi
(74) *Attorney, Agent, or Firm* — IP & T GROUP LLP

(57) ABSTRACT

A memory system includes a first memory and a second memory that share common addresses received from a memory controller, wherein the first memory includes a first scrambling circuit suitable for scrambling a common address to generate a first scrambled address designating a word line to be activated in the first memory, and the second memory includes a second scrambling circuit suitable for scrambling the common address to generate a second scrambled address designating a word line to be activated in the second memory, and the first scrambling circuit and the second scrambling circuit perform a scrambling operation in such a manner that neighboring word lines, adjacent to a word line selected by a first common address, are selected a most in one memory among the first memory and the second memory by a second common address other than the first common address.

4 Claims, 8 Drawing Sheets

FIG. 4

| | A<16> | A<15> | A<14> | A<13> | A<12> | A<11> | A<10> | A<9> | A<8> | A<7> | A<6> | A<5> | A<4> | A<3> | A<2> | A<1> | A<0> |
|---|---|---|---|---|---|---|---|---|---|---|---|---|---|---|---|---|---|
| 341 | | | | | | | | | | | | INV(2) | INV(1) | INV(0) | | | |
| 342 | | | | | | | | | | | INV(2) | INV(1) | INV(0) | | | | |
| 343 | | | | | | | | | | INV(2) | INV(1) | INV(0) | | | | | |
| 344 | | | | | | | | | INV(2) | INV(1) | INV(0) | | | | | | |
| 345 | | | | | | | | INV(2) | INV(1) | INV(0) | | | | | | | |
| 346 | | | | | | | INV(2) | INV(1) | INV(0) | | | | | | | | |
| 347 | | | | | | INV(2) | INV(1) | INV(0) | | | | | | | | | |
| 348 | | | | | INV(2) | INV(1) | INV(0) | | | | | | | | | | |
| 349 | | | | INV(2) | INV(1) | INV(0) | | | | | | | | | | | |

FIG. 5

| | A<16> | A<15> | A<14> | A<13> | A<12> | A<11> | A<10> | A<9> | A<8> | A<7> | A<6> | A<5> | A<4> | A<3> | A<2> | A<1> | A<0> |
|---|---|---|---|---|---|---|---|---|---|---|---|---|---|---|---|---|---|
| ADD | 0 | 0 | 1 | 1 | 0 | 0 | 1 | 0 | 1 | 0 | 0 | 1 | 0 | 0 | 1 | 1 | 0 |
| ADD_S0 | 0 | 0 | 1 | 1 | 0 | 0 | 1 | 0 | 1 | 0 | 0 | 0 | 1 | 0 | 1 | 1 | 0 |
| ADD_S1 | 0 | 0 | 1 | 1 | 0 | 0 | 1 | 0 | 1 | 0 | 1 | 0 | 0 | 0 | 1 | 1 | 0 |
| ADD_S2 | 0 | 0 | 1 | 1 | 0 | 0 | 1 | 0 | 1 | 1 | 1 | 1 | 0 | 0 | 1 | 1 | 0 |
| ADD_S3 | 0 | 0 | 1 | 1 | 0 | 0 | 1 | 0 | 0 | 1 | 0 | 1 | 0 | 0 | 1 | 1 | 0 |
| ADD_S4 | 0 | 0 | 1 | 1 | 0 | 0 | 0 | 1 | 1 | 0 | 0 | 1 | 0 | 0 | 1 | 1 | 0 |
| ADD_S5 | 0 | 0 | 1 | 1 | 0 | 0 | 0 | 1 | 1 | 0 | 0 | 1 | 0 | 0 | 1 | 1 | 0 |
| ADD_S6 | 0 | 0 | 1 | 1 | 0 | 1 | 1 | 0 | 1 | 0 | 0 | 1 | 0 | 0 | 1 | 1 | 0 |
| ADD_S7 | 0 | 0 | 1 | 1 | 1 | 1 | 1 | 0 | 1 | 0 | 0 | 1 | 0 | 0 | 1 | 1 | 0 |
| ADD_S8 | 0 | 0 | 1 | 0 | 1 | 0 | 1 | 0 | 1 | 0 | 0 | 1 | 0 | 0 | 1 | 1 | 0 |

FIG. 6

| | A<16> | A<15> | A<14> | A<13> | A<12> | A<11> | A<10> | A<9> | A<8> | A<7> | A<6> | A<5> | A<4> | A<3> | A<2> | A<1> | A<0> |
|---|---|---|---|---|---|---|---|---|---|---|---|---|---|---|---|---|---|
| ADD | 0 | 0 | 0 | 0 | 0 | 0 | 0 | 0 | 0 | 0 | 0 | 0 | 0 | 0 | 0 | 0 | 1 |
| ADD_S0 | 0 | 0 | 0 | 0 | 0 | 0 | 0 | 0 | 0 | 0 | 0 | 0 | 0 | 1 | 0 | 0 | 1 |
| ADD_S1 | 0 | 0 | 0 | 0 | 0 | 0 | 0 | 0 | 0 | 0 | 0 | 0 | 1 | 0 | 0 | 0 | 1 |
| ADD_S2 | 0 | 0 | 0 | 0 | 0 | 0 | 0 | 0 | 0 | 0 | 0 | 1 | 0 | 0 | 0 | 0 | 1 |
| ADD_S3 | 0 | 0 | 0 | 0 | 0 | 0 | 0 | 0 | 0 | 0 | 1 | 0 | 0 | 0 | 0 | 0 | 1 |
| ADD_S4 | 0 | 0 | 0 | 0 | 0 | 0 | 0 | 0 | 0 | 1 | 0 | 0 | 0 | 0 | 0 | 0 | 1 |
| ADD_S5 | 0 | 0 | 0 | 0 | 0 | 0 | 0 | 0 | 1 | 0 | 0 | 0 | 0 | 0 | 0 | 0 | 1 |
| ADD_S6 | 0 | 0 | 0 | 0 | 0 | 0 | 1 | 1 | 0 | 0 | 0 | 0 | 0 | 0 | 0 | 0 | 1 |
| ADD_S7 | 0 | 0 | 0 | 0 | 0 | 1 | 0 | 0 | 0 | 0 | 0 | 0 | 0 | 0 | 0 | 0 | 1 |
| ADD_S8 | 0 | 0 | 0 | 0 | 0 | 0 | 0 | 0 | 0 | 0 | 0 | 0 | 0 | 0 | 0 | 0 | 1 |

MEMORY SYSTEM

CROSS-REFERENCE TO RELATED APPLICATIONS

The present application is a divisional application of U.S. patent application Ser. No. 16/842,483 filed on Apr. 7, 2020, which claims priority to Korean Patent Application No. 10-2019-0096200, filed on Aug. 7, 2019, which is incorporated herein by reference in its entirety.

BACKGROUND

1. Field

Exemplary embodiments of the present invention relate to a memory system.

2. Description of the Related Art

As the integration degree of memories increases, the spacing between a plurality of word lines included in the memories is decreasing. As the spacing between the word lines decreases, the coupling effect between the neighboring word lines increases.

Whenever data is inputted/outputted to and from a memory cell, a word line toggles between an active state and an inactive state. Due to the coupling effect between the neighboring word lines, data of a memory cell coupled to a word line which is adjacent to a frequently activated word line may be damaged. This is called row hammering. Row hammering is a problem since data in a memory cell is damaged due to word line disturbance, before the memory cell is refreshed.

FIG. 1 is a schematic diagram illustrating a part of a cell array included in a memory device to describe row hammering.

In FIG. 1, 'WLL' may represent a word line that is frequently activated, and 'WLL−1' and 'WLL+1' may correspond to word lines disposed adjacent to the 'WLL', that is, word lines adjacent to the frequently activated word line. 'CL' may represent a memory cell coupled to the 'WLL', and 'CL−1' may represent a memory cell coupled to the 'WLL−1', and 'CL+1' may represent a memory cell coupled to the 'WLL+1'. The memory cells CL, CL−1 and CL+1 may respectively include cell transistors TL, TL−1 and TL+1 and cell capacitors CAPL, CAPL−1 and CAPL+1.

In FIG. 1, when 'WLL' is activated or inactivated, the voltages of 'WLL−1' and 'WLL+1' increase or decrease due to the coupling effect occurring between 'WLL', 'WLL−1' and 'WLL+1', affecting the amount of charges of the cell capacitors CAPL−1 and CAPL+1. Therefore, when 'WLL' is frequently activated and 'WLL' toggles between the active state and the inactive state, the variation in the amount of charges stored in the cell capacitors CAPL−1 and CAPL+1 included in the 'CL−1' and 'CL+1' may increase and the data in the memory cells may be deteriorated.

Also, the electromagnetic wave generated due to the toggling of the word line between the active state and the inactive state causes an inflow or outflow of electrons into or from a cell capacitor of a memory cell coupled to a neighboring word line, resulting in data which may be damaged.

SUMMARY

Embodiments of the present invention are directed to a method of reducing the influence of an error occurring due to a row hammering phenomenon in a memory system.

In accordance with an embodiment of the present invention, a memory system includes: a first memory and a second memory that share common addresses received from a memory controller, wherein the first memory includes a first scrambling circuit suitable for scrambling a common address to generate a first scrambled address designating a word line to be activated in the first memory, and the second memory includes a second scrambling circuit suitable for scrambling the common address to generate a second scrambled address designating a word line to be activated in the second memory, and the first scrambling circuit and the second scrambling circuit perform a scrambling operation in such a manner that neighboring word lines, adjacent to a word line selected by a first common address, are selected a most in one memory among the first memory and the second memory by a second common address other than the first common address.

In accordance with another embodiment of the present invention, a memory system includes: a first memory and a second memory suitable for sharing a common address, wherein the first memory includes a first scrambling circuit suitable for generating a first scrambled address by selectively inverting N bits, where N is an integer equal to or greater than 1, of the common address excluding lower N bits in response to the lower N bits of the common address, and the second memory includes a second scrambling circuit suitable for generating a second scrambled address by selectively inverting the N bits among the remaining bits of the common address excluding the lower N bits in response to the lower N bits of the common address, and at least one of positions of the N bits that are selectively inverted by the first scrambling circuit and positions of the N bits that are selectively inverted by the second scrambling circuit is different.

In accordance with yet another embodiment of the present invention, a memory system includes: a first memory that is accessed based on a first scrambled address; a second memory that is accessed based on a second scrambled address; a first scrambling circuit suitable for scrambling a common address received from a memory controller to generate the first scrambled address; and a second scrambling circuit suitable for scrambling the common address to generate the second scrambled address, wherein the first scrambling circuit and the second scrambling circuit perform a scrambling operation in such a manner that neighboring word lines, adjacent to a word line selected by a first common address, are selected at most in one memory among the first memory and the second memory by a second common address other than the first common address.

In accordance with still another embodiment of the present invention, a memory system includes: a first memory suitable for being accessed based on a first scrambled address; a second memory suitable for being accessed based on a second scrambled address; a first scrambling circuit suitable for generating the first scrambled address by selectively inverting N bits, where N is an integer equal to or greater than 1, of a common address excluding lower N bits in response to the lower N bits of the common address; and a second scrambling circuit suitable for generating the second scrambled address by selectively inverting the N bits among the remaining bits of the common address excluding the lower N bits in response to the lower N bits of the common address, wherein at least one of positions of the N bits that are selectively inverted by the first scrambling circuit and positions of the N bits that are selectively inverted by the second scrambling circuit is different.

In accordance with still another embodiment of the present invention, a memory system includes: a plurality of memories; and a plurality of scrambling circuits coupled to the plurality of memories in one-to-one correspondence, wherein the plurality of memories share a common address; wherein the each of the scrambling circuits scrambles the common address having K bits to access the corresponding memory based on the scrambling address; and wherein $Y^{th}$ scrambling circuit matches first to $X^{th}$ address bits of the common address with $(Y+X+S)^{th}$ to $(Y+2X+S)^{th}$ address bits of the common address in one-to-one correspondence to invert or not invert each bit value of the corresponding $(Y+X+S)^{th}$ to $(Y+2X+S)^{th}$ address bits of the common address based on each bit value of the first to $X^{th}$ address bits of the common address, and where K, X and Y are positive integers, and S is an integer equal to or greater than zero.

These and other feature and advantages of the present invention will become apparent to those skilled in the art of the invention from the following detailed description in conjunction with the following drawings.

BRIEF DESCRIPTION OF THE DRAWINGS

FIG. 4 illustrates a scrambling method of scrambling circuits 341 to 349 of FIG. 3 in accordance with various embodiments of the present invention.

FIGS. 5 and 6 illustrate scrambled addresses ADD_S0 to ADD_S8 ADD generated in the scrambling circuits 341 to 349 by scrambling an address ADD in accordance with various embodiments of the present invention.

DETAILED DESCRIPTION

Figure 1:
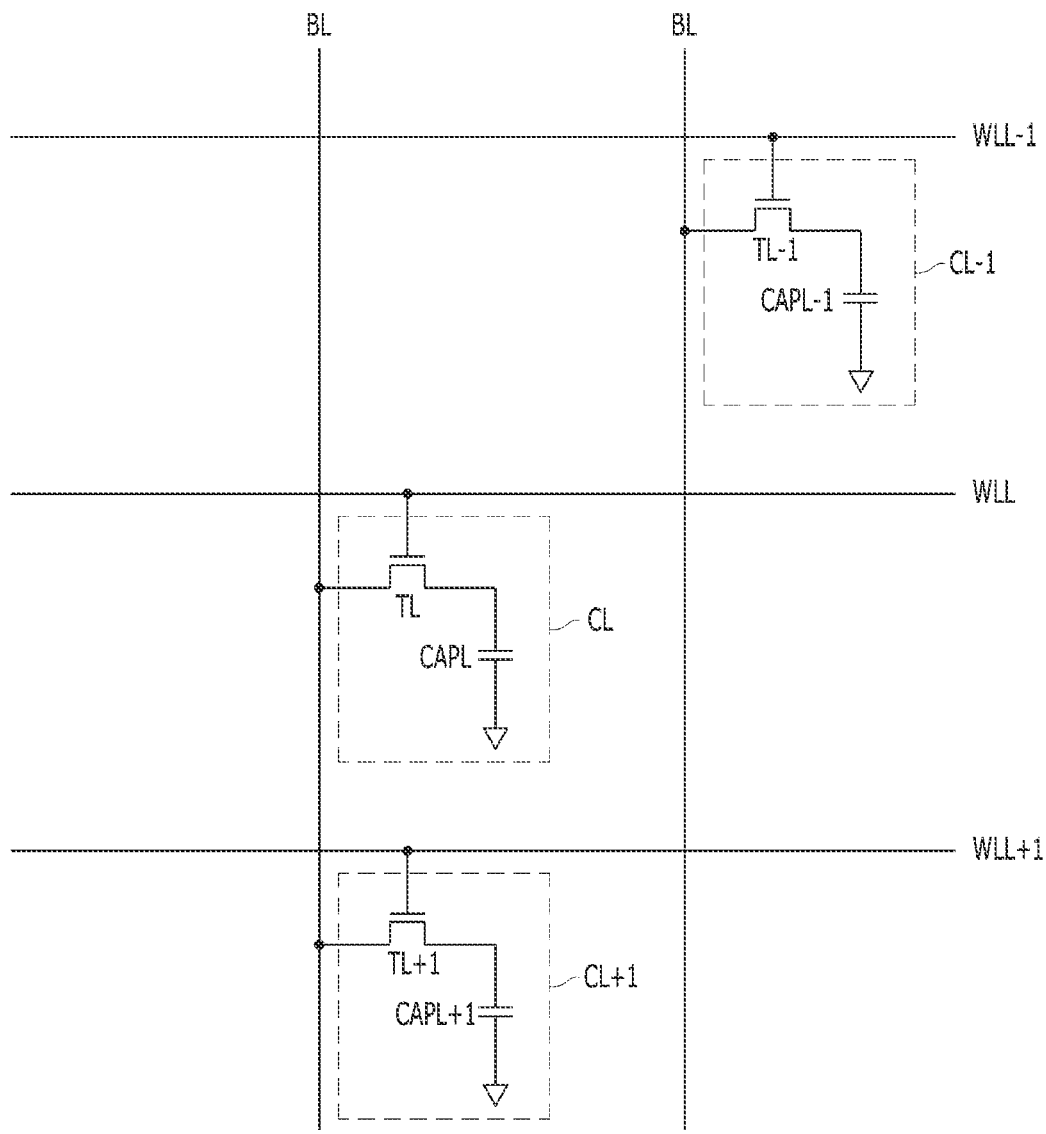
FIG. 1 is a schematic diagram illustrating row hammering.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
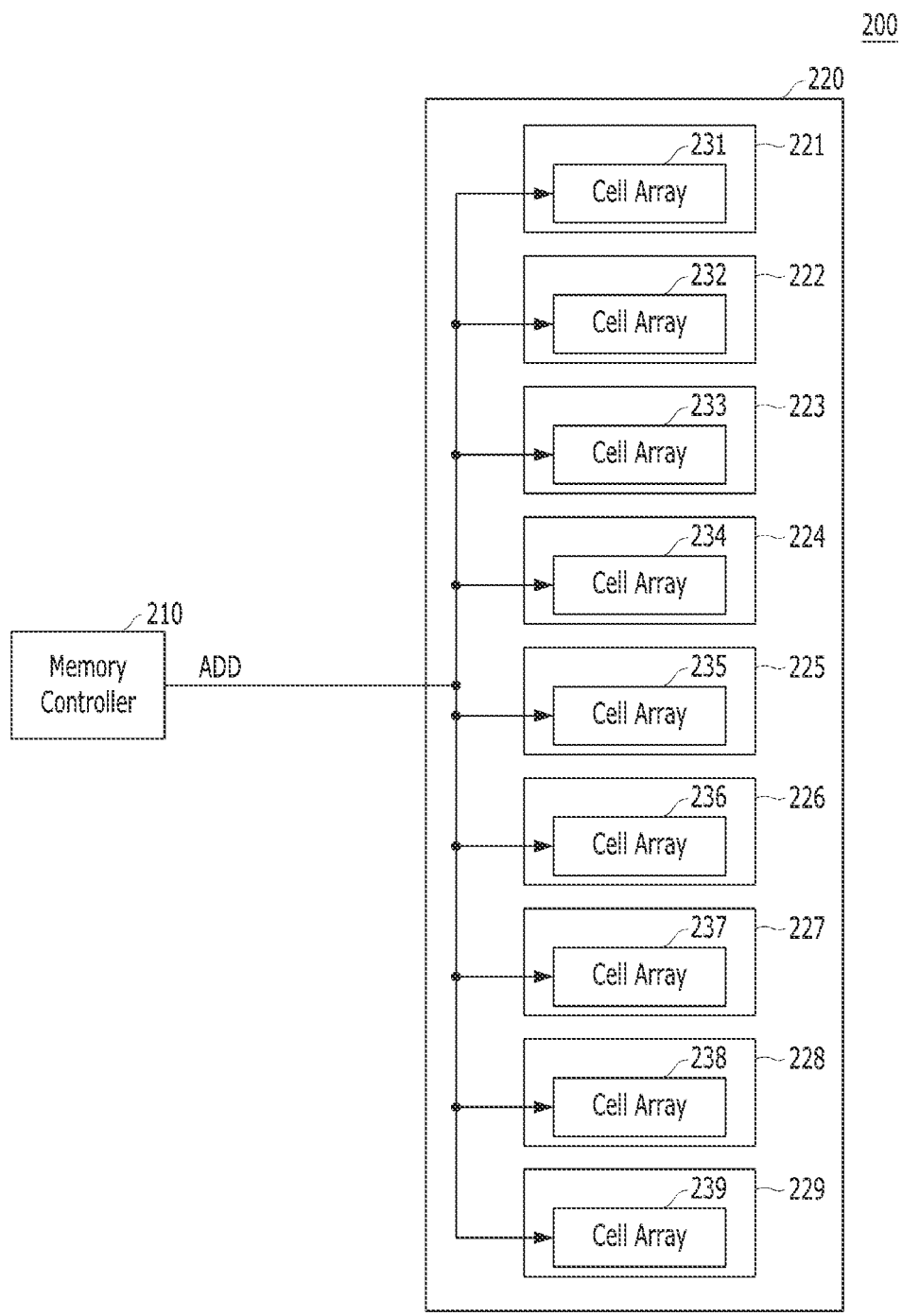
FIG. 2 is a block diagram of a memory system 200 in accordance with various embodiments of the present invention.

FIG. 2 is a block diagram of a memory system 200 in accordance with various embodiments of the present invention. FIG. 2 shows only a portion directly related to an address in the memory system 200.

Referring to FIG. 2, the memory system 200 may include a memory controller 210 and a memory module 220.

The memory controller 210 may control the operations of the memory module 220 such as an active operation, a read operation, and a write operation according to a request of a host. The memory controller 210 may transfer an address ADD for selecting an area to be accessed in the memory module 220 to the memory module 220.

The memory module 220 may include a plurality of memories 221 to 229. The memories 221 to 229 may be one of different types of memories, such as a Dynamic Random Access Memory (DRAM), a Phase Change Random Access Memory (PCRAM), a flash memory and the like. The memories 221 to 229 may respectively include cell arrays 231 to 239, and an area designated by an address ADD may be accessed in the cell arrays 231 to 239.

The memory module 220 may be a Dual In-Line Memory Module (DIMM) type. The memories 221 to 229 may share the same address ADD and may simultaneously perform the same operation. For example, a total of 576 bits of information including 512 bits of data and 64 bits of ECC code may be written into the memory module 220 during a write operation. Herein, 576 bits of the data and the ECC code may be divided such that 64 bits of information may be written to each of the memories 221 to 229. Similarly, during a read operation, 64-bit information may be outputted from each of the memories 221 to 229 so that 576-bit information (which includes 512-bit data and 64-bit ECC code) may be transferred to the memory controller 210.

In the memory system 200 of FIG. 2, all of the memories 221 to 229 may share the same address ADD, which may increase the vulnerability of the memory module 220 to a low hammer. For example, when an $A^{th}$ word line is accessed many times over within a short period of time and then an $(A+1)^{th}$ word line is accessed in the memories 221 to 229, a probability that an error occurs may be increased in all of the memories 221 to 229. When the probability that an error occurs in all the memories 221 to 229 increases, the number of errors may increase, accordingly. Therefore, the possibility of exceeding the number of errors that are correctable by an ECC circuit in the memory controller 210 may increase, which may cause a malfunction of the system 200.

Figure 3:
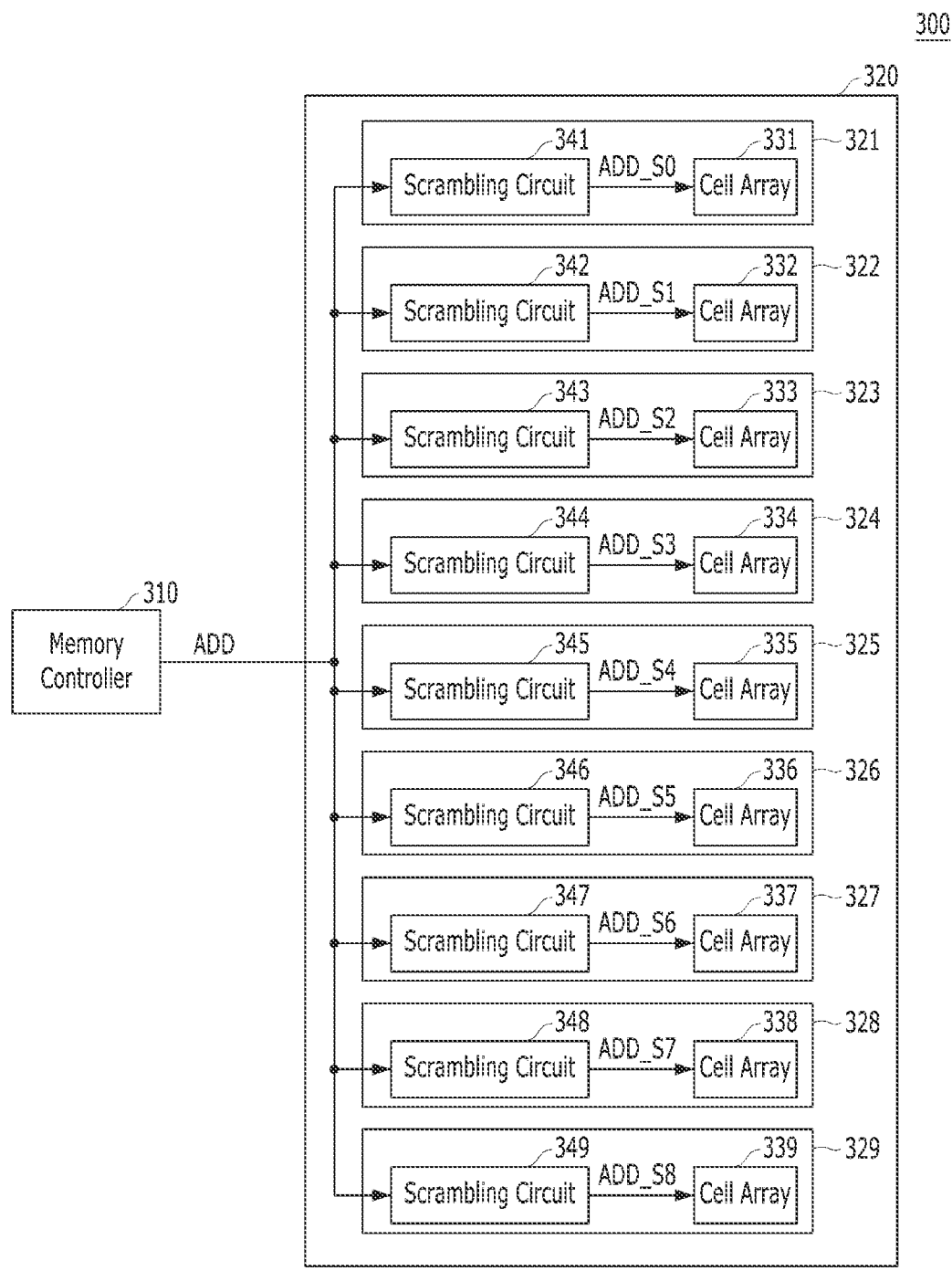
FIG. 3 is a block diagram of a memory system 300 in accordance with various embodiments of the present invention.

FIG. 3 is a block diagram of a memory system 300 in accordance with various embodiments of the present invention. FIG. 3 shows only a portion directly related to an address in the memory system 300.

Referring to FIG. 3, the memory system 300 may include a memory controller 310 and a memory module 320.

The memory controller 310 may control the operations of the memory module 320 such as an active operation, a read operation, and a write operation according to a request of a host. The memory controller 310 may transfer an address ADD for selecting an area to be accessed in the memory module 320 to the memory module 320.

The memory module 320 may include a plurality of memories 321 to 329. The memories 321 to 329 may be one of different types of memories, such as a Dynamic Random Access Memory (DRAM), a Phase Change Random Access Memory (PCRAM), a flash memory and the like. The memories 321 to 329 may respectively include scrambling circuits 341 to 349 and cell arrays 331 to 339.

The scrambling circuits 341 to 349 of the memories 321 to 329 may scramble an address ADD to generate scrambled addresses ADD_S0 to ADD_S8. The scrambling circuits 341 to 349 may receive the same address ADD. However, the scrambling results, which are the scrambled addresses ADD_S0 to ADD_S8, may be different from each other.

The cell arrays 331 to 339 of the memories 321 to 329 may be accessed based on the scrambled addresses ADD_S0 to ADD_S8.

Since the cell arrays 331 to 339 can be accessed by different scrambled addresses ADD_S0 to ADD_S8, different areas may be accessed in the cell arrays 331 to 339.

The memory module 320 may be a Dual In-Line Memory Module (DIMM) type. The memories may share the same address ADD and may simultaneously perform the same operation. For example, a total of 576 bits of information including 512 bits of data and 64 bits of ECC code may be written into the memory module 320 during a write operation. Herein, 576 bits of the data and the ECC code may be divided such that 64 bits of information can be written to each of the memories 321 to 329. Similarly, during a read operation, 64-bit information may be outputted from each of the memories 321 to 329 so that 576-bit information (which includes 512-bit data and 64-bit ECC code) may be transferred to the memory controller 310.

The memory module 320 may be types other than the DIMM. For example, the memories 321 to 329 and the memory controller 310 may be attached onto the same Printed Circuit Board (PCB) substrate. The memory system 300 may have diverse forms of a physical structure.

The scrambling circuits 341 to 349 of the memories 321 to 329 may operate to reduce the influence of an error occurring due to row hammering in the memory system 300. The scrambling circuits 341 to 349 may perform a scrambling operation such that the neighboring word lines, adjacent to a word line selected by a first address received from the memory controller 310, may be selected at most in one memory among the memories 321 to 329 by a second address received from the memory controller 310.

Herein, active commands along with an N address ADD are applied from the memory controller 310 to the memory module 320 several times. In this case, different words lines may be activated several times by the scrambling circuits 341 to 349 in the memories 321 to 329. In other words, an $A^{th}$ word line may be activated a plurality of times in the memory 321, and a $B^{th}$ word line may be activated a plurality of times in the memory 322, and a $C^{th}$ word line may be activated a plurality of times in the memory 323, and a $D^{th}$ word line may be activated a plurality of times in the memory 324, and an $E^{th}$ word line may be activated a plurality of times in the memory 325, and an $F^{th}$ word line may be activated a plurality of times in the memory 326, and a $G^{th}$ word line may be activated a plurality of times in the memory 327, and an $H^{th}$ word line may be activated a plurality of times in the memory 328, and an $I^{th}$ word line may be activated a plurality of times in the memory 329 (where A to I are different arbitrary integers that are equal to or greater than 0). In this case, the data of the $(A+1)^{th}$ and $(A-1)^{th}$ word lines may be deteriorated by row hammering in the memory 321, and the data of the $(B+1)^{th}$ and $(B-1)^{th}$ word lines may be deteriorated by row hammering in the memory 322, and the data of the $(C+1)^{th}$ and $(C-1)^{th}$ word lines may be deteriorated by row hammering in the memory 323, and the data of the $(D+1)^{th}$ and $(D-1)^{th}$ word lines may be deteriorated by row hammering in the memory 324, and the data of the $(E+1)^{th}$ and $(E-1)^{th}$ word lines may be deteriorated by row hammering in the memory 325, and the data of the $(F+1)^{th}$ and $(F-1)^{th}$ word lines may be deteriorated by row hammering in the memory 326, and the data of the $(G+1)^{th}$ and $(G-1)^{th}$ word lines may be deteriorated by row hammering in the memory 327, and the data of the $(H+1)^{th}$ and $(H-1)^{th}$ word lines may be deteriorated by row hammering in the memory 328, and the data of the $(I+1)^{th}$ and $(I-1)^{th}$ word lines may be deteriorated by row hammering in the memory 329.

Subsequently, herein an active command is applied from the memory controller 310 to the memory module 320 along with an M address ADD, and a read operation is performed. In this case, when a word line adjacent to the word line that is activated by the N address ADD may be activated at most in one memory among the memories 321 to 329 by the scrambling circuits 341 to 349, the number of memories that output the data affected by the row hammering may be at most one among the memories 321 to 329.

For example, if the $(C+1)^{th}$ word line that is affected by row hammering is selected in the memory 323 based on the M address ADD, word lines that are not affected by the row hammering may be selected in the remaining memories 321, 322, and 324 to 329. When the data affected by the row hammering are outputted from at most one memory among the nine memories 321 to 329 during a read operation, the ECC circuit of the memory controller 310 may easily correct the errors because the amount of the errors is small. In short, the data deterioration caused by row hammering may not affect the operation of the memory system 300 at all.

FIG. 4 illustrates a scrambling method of the scrambling circuits 341 to 349 shown in FIG. 3. FIG. 4 describes one example of the scrambling methods for allowing neighboring word lines at most in one memory of the memories 321 to 329 to be selected based on two arbitrary addresses ADD. FIG. 4 exemplarily shows an address ADD of 17 bits. A<0> to A<16> in the figure may represents the 17 bits constituting the address ADD.

The scrambling circuits 341 to 349 may scramble the address ADD through a scrambling method of selectively inverting X bits (X is a positive integer) among the remaining bits of the address ADD excluding lower X bits of the address ADD in response to the lower X bits of the address ADD. Also, at least one of the positions (number of digits) of the X bits that is selectively inverted may be different for each scrambling circuit. In FIG. 4, it is exemplarily illustrated that the scrambling circuits 341 to 349 may selectively invert three bits among the remaining bits A<3> to A<16> excluding lower three bits A<0> to A<2> of the address ADD in response to the lower three bits A<0> to A<2> of the address ADD.

Referring to FIG. 4, it may be seen that INV(0) corresponds to A<3> of the address ADD inputted to the scrambling circuit 341, and INV(1) corresponds to A<4> of the address ADD inputted to the scrambling circuit 341, and INV(2) corresponds to A<5> of the address ADD inputted to the scrambling circuit 341. This shows that the scrambling circuit 341 selectively inverts INV(0) corresponding to the A<3> bit of the address ADD according to a logic level of the A<0> bit of the address ADD, selectively inverts INV(1) corresponding to the A<4> bit of the address ADD according to a logic level of the A<1> bit of the address ADD, and selectively inverts INV(2) corresponding to the A<5> bit of the address ADD according to a logic level of the A<2> bit of the address ADD. That is, INV(0) corresponding to A<3> may be inverted when the logic level of A<0> is '1', while INV(0) corresponding to A<3> may not be inverted when the logic level of A<0> is '0'. Likewise, INV(1) corresponding to A<4> may be or may not be inverted according to whether the logic level of A<1> is '1' or '0', and INV(2) corresponding to A<5> may be or may not be inverted according to whether the logic level of A<2> is '1' or '0'.

Also, as shown in FIG. 4, the scrambling circuit 342 may selectively invert INV(0) to INV(2) corresponding to A<4> to A<6> according to the logic levels of A<0> to A<2>; the scrambling circuit 343 may selectively invert INV(0) to INV(2) corresponding to A<5> to A<7> according to the logic levels of A<0> to A<2>; the scrambling circuit 344 may selectively invert INV(0) to INV(2) corresponding to A<6> to A<8> according to the logic levels of A<0> to A<2>; the scrambling circuit 345 may selectively invert INV(0) to INV(2) corresponding to A<7> to A<9> according to the logic levels of A<0> to A<2>; the scrambling circuit 346 may selectively INV(0) to INV(2) corresponding to invert A<8> to A<10> according to the logic levels of A<0> to A<2>; the scrambling circuit 347 may selectively invert INV(0) to INV(2) corresponding to A<9> to A<11> according to the logic levels of A<0> to A<2>; the scrambling circuit 348 may selectively invert INV(0) to INV(2) corresponding to A<10> to A<12> according to the logic levels of A<0> to A<2>; and the scrambling circuit 349 may selectively invert INV(0) to INV(2) corresponding to A<11> to A<13> according to the logic levels of A<0> to A<2>.

As shown in FIG. 4, when the scrambling circuits 341 to 349 perform a scrambling operation, neighboring word lines, adjacent to a word line selected by a first address received from the memory controller 310, may be selected at most in one memory among the memories 321 to 329 by a second address received from the memory controller 310.

FIGS. 5 and 6 illustrate the scrambling circuits 341 to 349 scrambling the address ADD to generate scrambled addresses ADD_S0 to ADD_S8 in the scrambling method of FIG. 4.

Referring to FIG. 5, it may be seen that since the lower 3 bits A<0> to A<2> of the address ADD are A<0>=0, A<1>=1, and A<2>=1, the bits corresponding to INV(1) and INV(2) in FIG. 4 are inverted and as a result, the scrambled addresses ADD_S0 to ADD_S8 are generated. For example, it may be seen that the scrambled address ADD_S3 is generated by inverting INV(1) and INV(2) corresponding to A<7> and A<8> of the address ADD.

Referring to FIG. 6, it may be seen that since the lower 3 bits A<0> to A<2> of the address ADD are A<0>=1, A<1>=0, and A<2>=0, the bit corresponding to INV(0) in FIG. 4 is inverted and as a result, the scrambled addresses ADD_S0 to ADD_S8 are generated. For example, it may be seen that the scrambled address ADD_S6 is generated by inverting INV(0) corresponding to A<9> of the address ADD.

Figure 7:
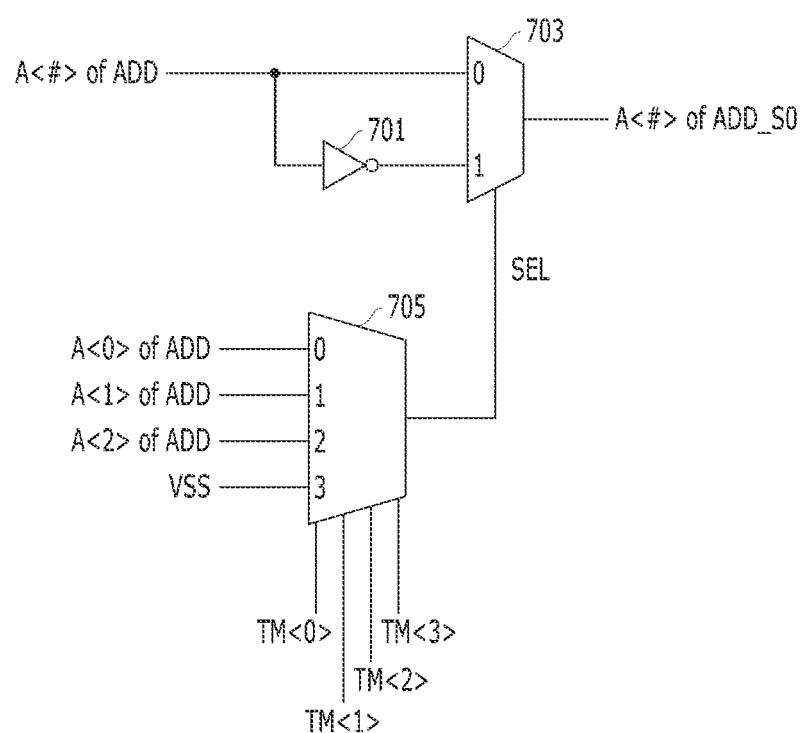
FIG. 7 is a schematic diagram illustrating a scrambling circuit 341 in accordance with various embodiments of the present invention.

FIG. 7 is a schematic diagram illustrating the scrambling circuit 341. FIG. 7 illustrates a structure of inverting or non-inverting a $\#^{th}$ bit in the scrambling circuit 341. The scrambling circuit 341 may include a plurality of the structures of FIG. 7.

Referring to FIG. 7, a structure for inverting an A<#>$^{th}$ bit may include an inverter 701 and multiplexers 703 and 705.

The inverter 701 may invert and output a $\#^{th}$ bit of the address ADD (A<#> of ADD). When a logic level of a select signal SEL is '0', the multiplexer 703 may output the $\#^{th}$ bit of the address ADD (A<#> of ADD) as a $\#^{th}$ bit of the scrambled address ADD_S0 (A<#> of ADD_S0). When the logic level of a select signal SEL is '1', the multiplexer 703 may output the output of the inverter 701 as a $\#^{th}$ bit of the scrambled address ADD_S0 (A<#> of ADD_S0). The multiplexer 705 may select one among A<0> of ADD, A<1> of ADD, A<2> of ADD, and a ground voltage VSS according to test mode signals TM<0> to TM<3> and output the selected one as the selection signal SEL.

The test mode signals TM<0> to TM<3> may be signals whose logic levels are determined according to how the signals are set, and the test mode signals TM<0> to TM<3> may be set in such a manner that one of the test mode signals TM<0> to TM<3> is activated. When the test mode signal TM<0> is activated, A<0> of ADD may serve as the selection signal SEL. Therefore, A<#> of ADD may be inverted/non-inverted according to the logic level of A<0> of ADD to become A<#> of ADD_S0. Likewise, when the test mode signal TM<2> is activated, A<2> of ADD may serve as the selection signal SEL. Therefore, A<#> of ADD may be inverted/non-inverted according to the logic level of A<2> of ADD to become A<#> of ADD_S0. When the test mode signal TM<3> is activated, the ground voltage VSS (VSS=0) may serve as the selection signal SEL. Therefore, A<#> of ADD may become A<#> of ADD_S0 as it is (non-inverted).

In other words, based on how to set the scrambling circuit, the scrambling circuit of FIG. 7 may output an $\#^{th}$ bit of the address ADD as it is, or may selectively invert and output the $\#^{th}$ bit of the address ADD according to the logic level of A<0>, or may selectively invert and output the $\#^{th}$ bit of the address ADD according to the logic level of A<1>, or may selectively invert and output the $\#^{th}$ bit of the address ADD according to the logic level of A<2>.

The remaining scrambling circuits 342 to 349 may also include a plurality of structures shown in FIG. 7.

Figure 8:
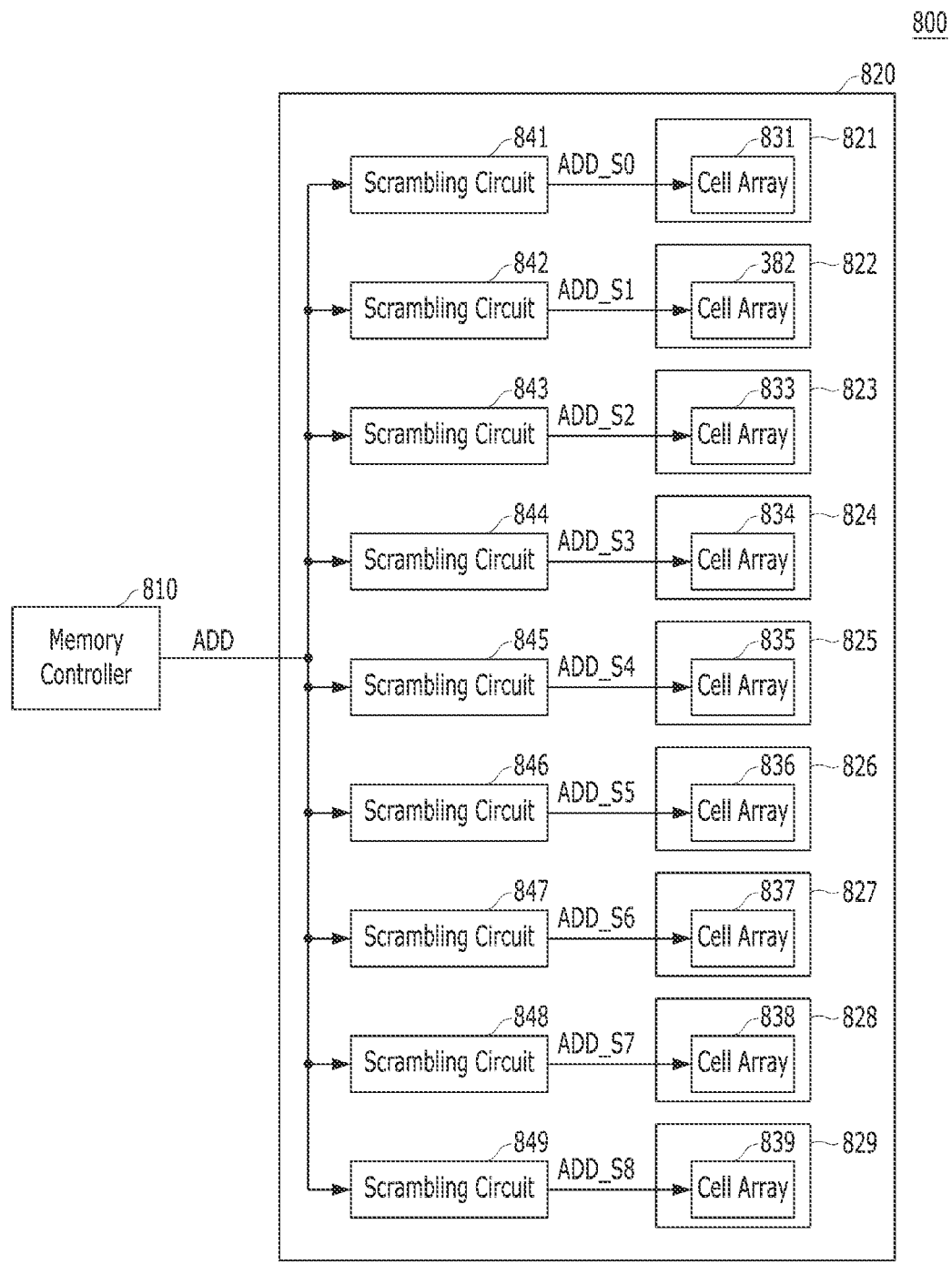
FIG. 8 is a block diagram of a memory system 800 in accordance with various embodiments of the present invention.

FIG. 8 is a block diagram of a memory system 800 in accordance with various embodiments of the present invention. In FIG. 8, only a portion directly related to an address in the memory system 800 is illustrated.

Referring to FIG. 8, the memory system 800 may include a memory controller 810 and a memory module 820.

The memory controller 810 may control the operations of the memory module 820, such as an active operation, a read operation, and a write operation, according to a request of the host. The memory controller 810 may transfer an address ADD for selecting an area to be accessed in the memory module 820 to the memory module 820.

The memory module 820 may include a plurality of scrambling circuits 841 to 849 and a plurality of memories 821 to 829.

The scrambling circuits 841 to 849 may be formed and operate in the same way as the scrambling circuits 341 to 349 described with reference to FIGS. 3 to 7. The scrambling circuits 841 to 849 may be slightly different from the scrambling circuits 341 to 349 in that the scrambling circuits 841 to 849 may be placed at the outside of the memories 821 to 829, instead of the inside of the memories 821 to 829. Also, the memories 821 to 829 may be formed and operate in the same way as the memories 321 to 329, except that the memories 821 to 829 do not include the scrambling circuits 841 to 849.

In short, the memory system 800 of FIG. 8 may be formed and operate in the same way as the memory system 300 of FIG. 3, except that only the positions of the scrambling circuits 841 to 849 are changed.

According to the embodiments of the present invention, it is possible to reduce the influence of an error occurring due to row hammering in a memory system.

While the present invention has been described with respect to the specific embodiments, it will be apparent to those skilled in the art that various changes and modifications may be made without departing from the spirit and scope of the invention as defined in the following claims.

What is claimed is:
1. A memory system comprising:
a first memory and a second memory suitable for sharing a common address,
wherein the first memory includes a first scrambling circuit suitable for generating a first scrambled address by selectively inverting N bits, where N is an integer equal to or greater than 1, of the common address excluding lower N bits in response to the lower N bits of the common address, and the second memory includes a second scrambling circuit suitable for generating a second scrambled address by selectively inverting the N bits among the remaining bits of the common address excluding the lower N bits in response to the lower N bits of the common address, and at least one of positions of the N bits that are selectively inverted by the first scrambling circuit and positions of the N bits that are selectively inverted by the second scrambling circuit is different.

2. The memory system of claim 1, wherein the first scrambling circuit matches the lower N bits of the common address to the N bits among the remaining bits of the common address in one-to-one correspondence, and inverts a matched bit when a value of a lower bit is '1' and does not invert a matched bit when a value of a lower bit is '0', and the second scrambling circuit matches the lower N bits of the common address to the N bits among the remaining bits of the common address in one-to-one correspondence, and inverts a matched bit when a value of a lower bit is '1' and does not invert a matched bit when a value of a lower bit is '0'.

3. A memory system, comprising:

a first memory suitable for being accessed based on a first scrambled address;

a second memory suitable for being accessed based on a second scrambled address;

a first scrambling circuit suitable for generating the first scrambled address by selectively inverting N bits, where N is an integer equal to or greater than 1, of a common address excluding lower N bits in response to the lower N bits of the common address; and a second scrambling circuit suitable for generating the second scrambled address by selectively inverting the N bits among the remaining bits of the common address excluding the lower N bits in response to the lower N bits of the common address, wherein at least one of positions of the N bits that are selectively inverted by the first scrambling circuit and positions of the N bits that are selectively inverted by the second scrambling circuit is different.

4. The memory system of claim 3, wherein the first scrambling circuit matches the lower N bits of the common address to the N bits among the remaining bits of the common address in one-to-one correspondence, and inverts a matched bit when a value of a lower bit is '1' and does not invert a matched bit when a value of a lower bit is '0', and the second scrambling circuit matches the lower N bits of the common address to the N bits among the remaining bits of the common address in one-to-one correspondence, and inverts a matched bit when a value of a lower bit is '1' and does not invert a matched bit when a value of a lower bit is '0'.

* * * * *